(12) United States Patent
Nakano et al.

(10) Patent No.: US 12,188,953 B2
(45) Date of Patent: Jan. 7, 2025

(54) AUTOMATIC ANALYZER

(71) Applicant: Hitachi High-Tech Corporation, Tokyo (JP)

(72) Inventors: Hiroki Nakano, Tokyo (JP); Hidetsugu Tanoue, Tokyo (JP); Yoichiro Suzuki, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 579 days.

(21) Appl. No.: 16/646,189

(22) PCT Filed: Jan. 29, 2019

(86) PCT No.: PCT/JP2019/002853
§ 371 (c)(1),
(2) Date: Mar. 11, 2020

(87) PCT Pub. No.: WO2019/176342
PCT Pub. Date: Sep. 19, 2019

(65) Prior Publication Data
US 2020/0271679 A1      Aug. 27, 2020

(30) Foreign Application Priority Data

Mar. 16, 2018  (JP) ................. 2018-048755

(51) Int. Cl.
*G01N 35/02*      (2006.01)
*G01N 35/04*      (2006.01)
*G01N 35/10*      (2006.01)

(52) U.S. Cl.
CPC ........... *G01N 35/025* (2013.01); *G01N 35/04* (2013.01); *G01N 35/1002* (2013.01);
(Continued)

(58) Field of Classification Search
CPC .. G01N 35/025; G01N 35/04; G01N 35/1002; G01N 35/1016; G01N 2035/0443; G01N 2035/1025; G01F 23/292
See application file for complete search history.

(56) References Cited

U.S. PATENT DOCUMENTS 4,775,637 A * 10/1988 Sutherland ........... G01N 33/723
                                                            436/805
4,844,887 A * 7/1989 Galle ..................... G01N 35/02
                                                            422/65

(Continued)

FOREIGN PATENT DOCUMENTS

CN         1366608 A      8/2002
CN       101632024 A      1/2010

(Continued)

OTHER PUBLICATIONS

Extended European Search Report received in corresponding European Application No. 19767153.0 dated Apr. 8, 2022.

(Continued)

*Primary Examiner* — P. Kathryn Wright
*Assistant Examiner* — Curtis A Thompson
(74) *Attorney, Agent, or Firm* — MATTINGLY & MALUR, PC

(57) ABSTRACT

An automatic analyzer which accurately detects a liquid volume of a reagent irrespective of a shape of a reagent container is provided. The invention is directed to an automatic analyzer including: a reagent container that contains a reagent; an emission unit that is provided outside the reagent container and emits light so as to pass inside the reagent container; a light receiving unit that is provided outside the reagent container and receives the light emitted from the emission unit; and a determination unit that, based on the light received by the light receiving unit, detects a liquid level inside the reagent container, and determines whether a (Continued)

liquid volume in the reagent container becomes equal to or less than a predetermined value from the liquid level. A wavelength of the light is determined based on a material of the reagent container and a type of the reagent.

10 Claims, 6 Drawing Sheets

(52) U.S. Cl.
CPC . *G01N 35/1016* (2013.01); *G01N 2035/0443* (2013.01); *G01N 2035/1025* (2013.01)

(56) References Cited

U.S. PATENT DOCUMENTS

| | | | | |
|---|---|---|---|---|
| 4,919,534 | A * | 4/1990 | Reed | B07C 5/3416 |
| | | | | 356/402 |
| 5,314,825 | A * | 5/1994 | Weyrauch | G01N 35/1079 |
| | | | | 422/63 |
| 6,993,176 | B2 | 1/2006 | Yamagishi et al. | |
| 7,780,360 | B2 * | 8/2010 | Bhowmik | H01S 5/4062 |
| | | | | 372/50.21 |
| 2002/0154809 | A1 | 10/2002 | Yamagishi et al. | |
| 2003/0141456 | A1 * | 7/2003 | Mc Neal | G01F 23/292 |
| | | | | 250/357.1 |
| 2005/0156607 | A1 * | 7/2005 | Okamura | G01F 23/284 |
| | | | | 324/639 |
| 2006/0190187 | A1 * | 8/2006 | Mishima | G16H 10/40 |
| | | | | 702/19 |
| 2010/0001854 | A1 * | 1/2010 | Kojima | G01N 35/00584 |
| | | | | 702/19 |
| 2010/0323923 | A1 * | 12/2010 | Corbett | B01L 7/5255 |
| | | | | 219/494 |
| 2011/0236981 | A1 * | 9/2011 | Wakamiya | G01N 35/1011 |
| | | | | 422/69 |
| 2012/0301359 | A1 * | 11/2012 | Kraemer | G01N 35/04 |
| | | | | 422/64 |
| 2016/0313362 | A1 * | 10/2016 | Sugiyama | G01N 35/00722 |
| 2017/0160298 | A1 * | 6/2017 | Wakamiya | G01N 35/00663 |

FOREIGN PATENT DOCUMENTS

| | | | |
|---|---|---|---|
| JP | 60-064254 | A | 4/1985 |
| JP | 02-118454 | A | 5/1990 |
| JP | 02-243960 | A | 9/1990 |
| JP | 4-329362 | A | 11/1992 |
| JP | 07-020133 | A | 1/1995 |
| JP | 11-072369 | A | 3/1999 |
| JP | 2000-028622 | A | 1/2000 |
| JP | 2001-221746 | A | 8/2001 |
| JP | 2002-122604 | A | 4/2002 |
| JP | 2008-003057 | A | 1/2008 |
| JP | 2011-102705 | A | 5/2011 |

OTHER PUBLICATIONS

International Search Report of PCT/JP2019/002853 dated Apr. 16, 2019.
Chinese Office Action received in corresponding Chinese Application No. 201980004701.3 dated Dec. 5, 2023.
Chinese Office Action received in corresponding Chinese Application No. 201980004701.3 dated Jun. 21, 2024.
Chinese Office Action received in corresponding Chinese Application No. 201980004701.3 dated Apr. 10, 2024.

* cited by examiner

[FIG. 1]
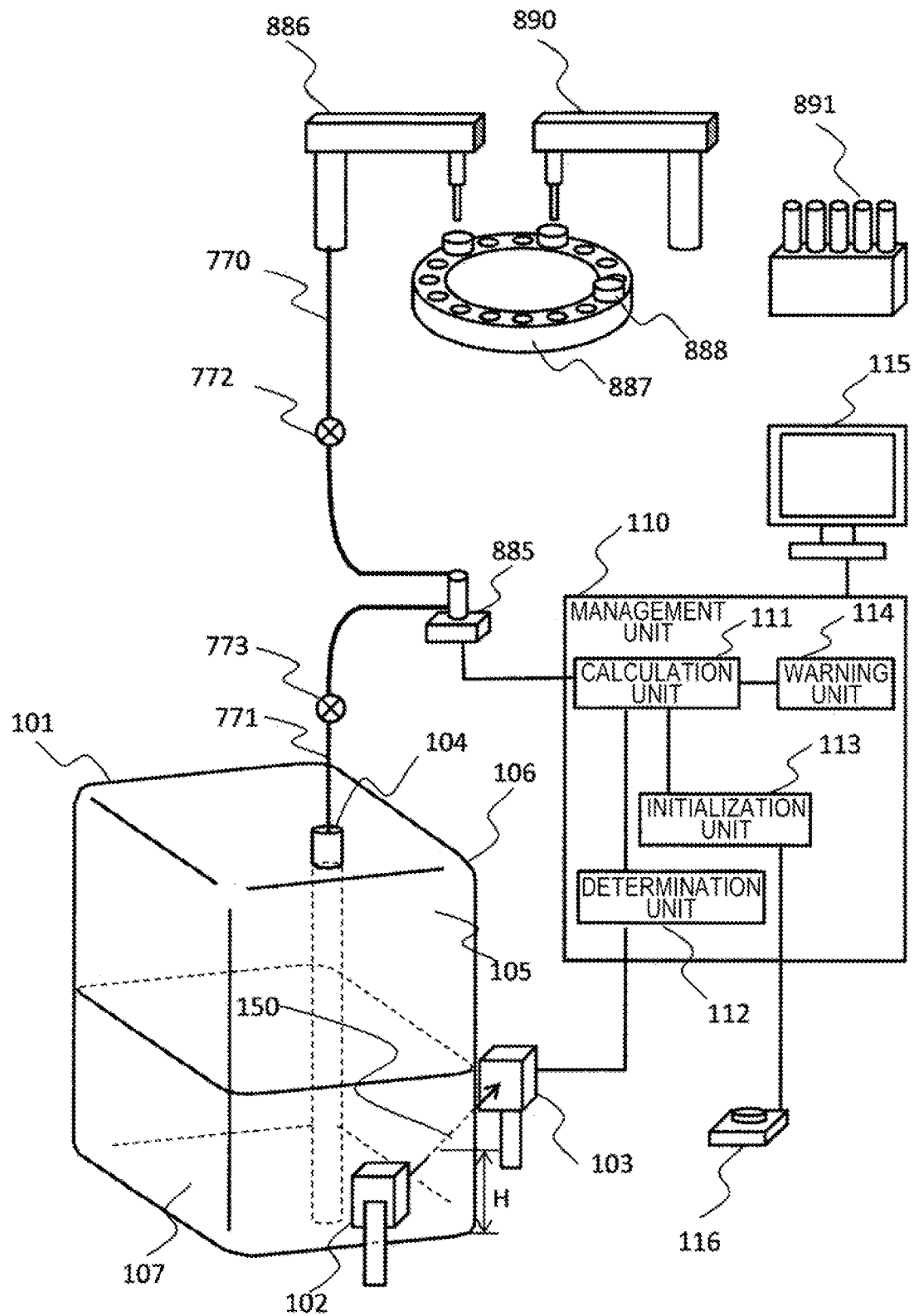

[FIG. 2A]
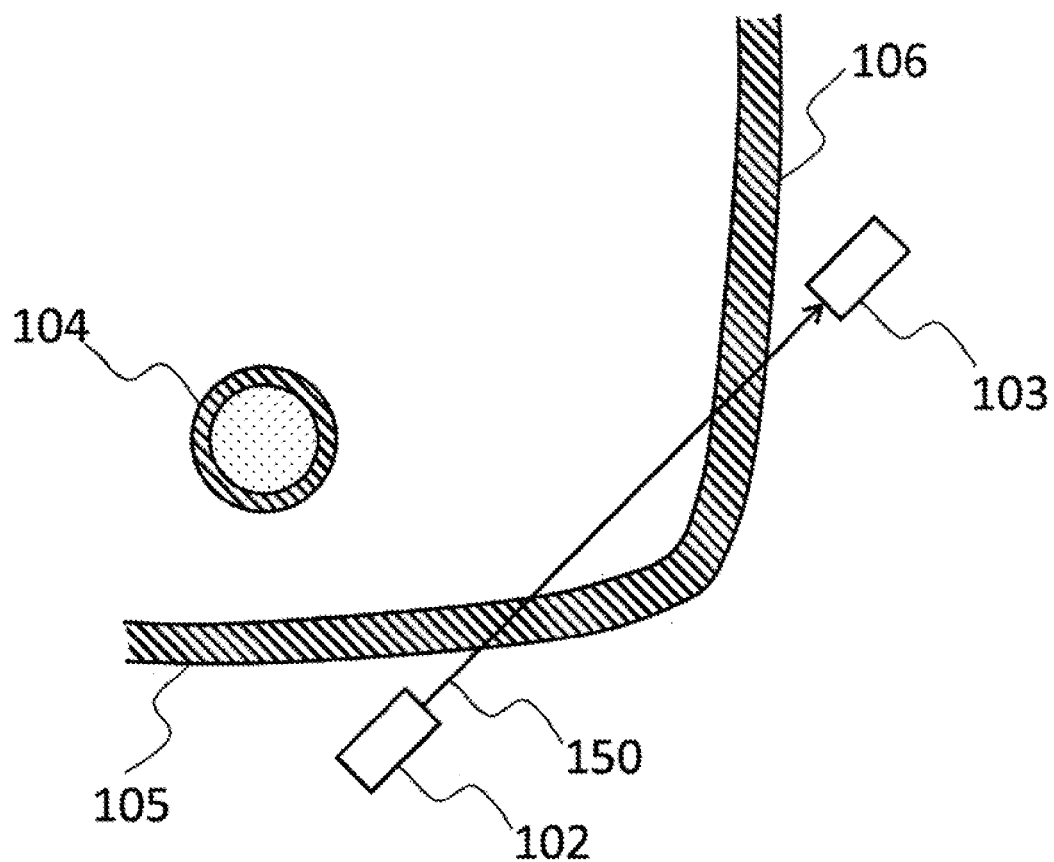

[FIG. 2B]
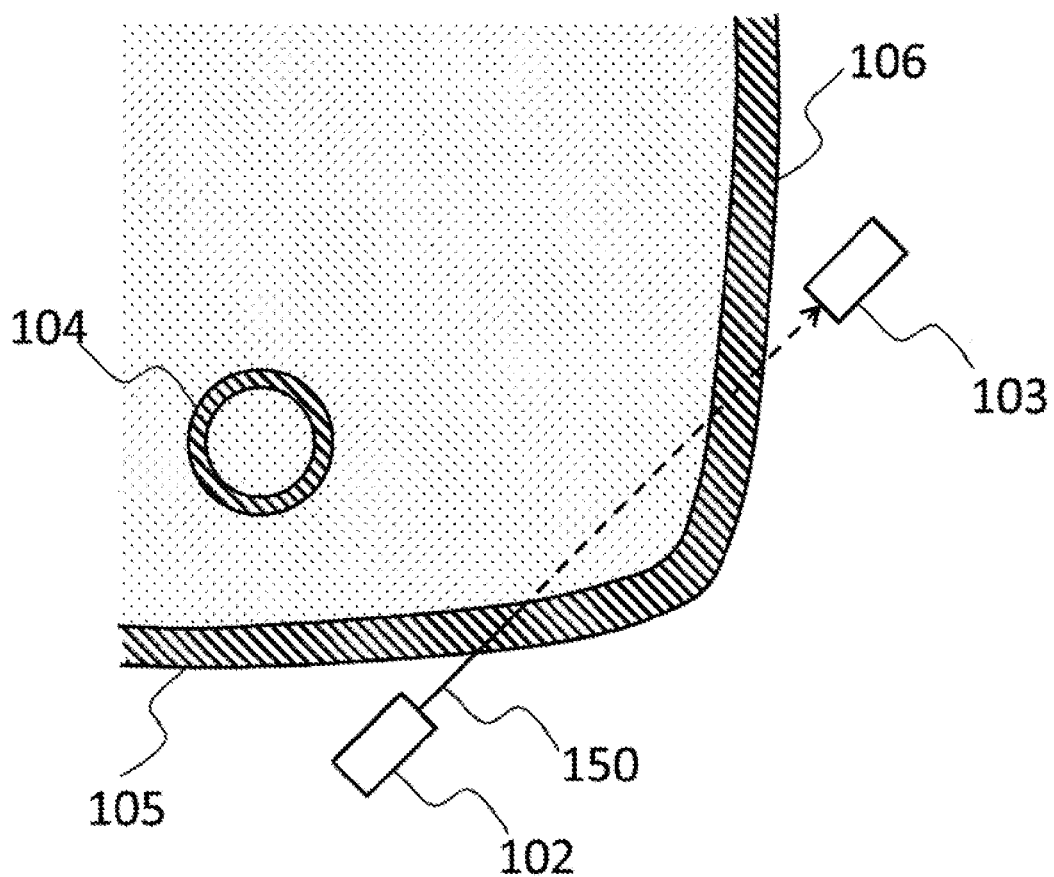

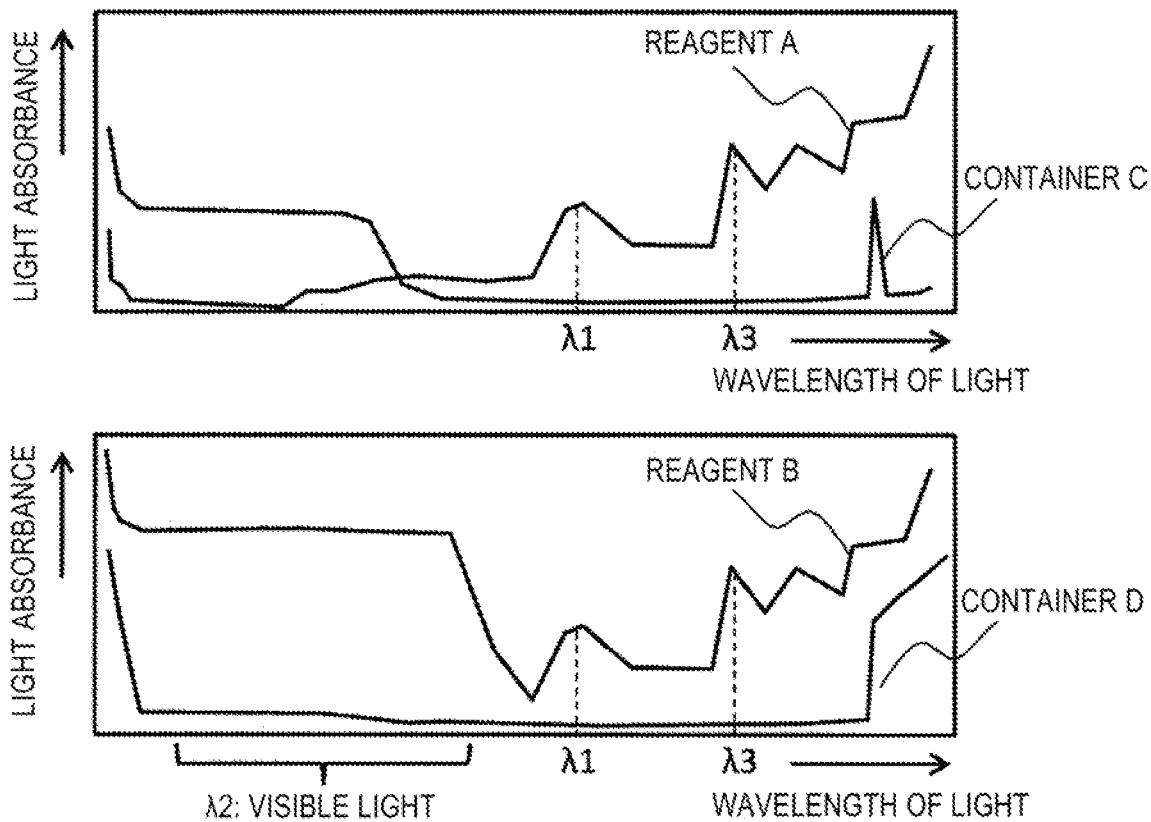

[FIG. 4]
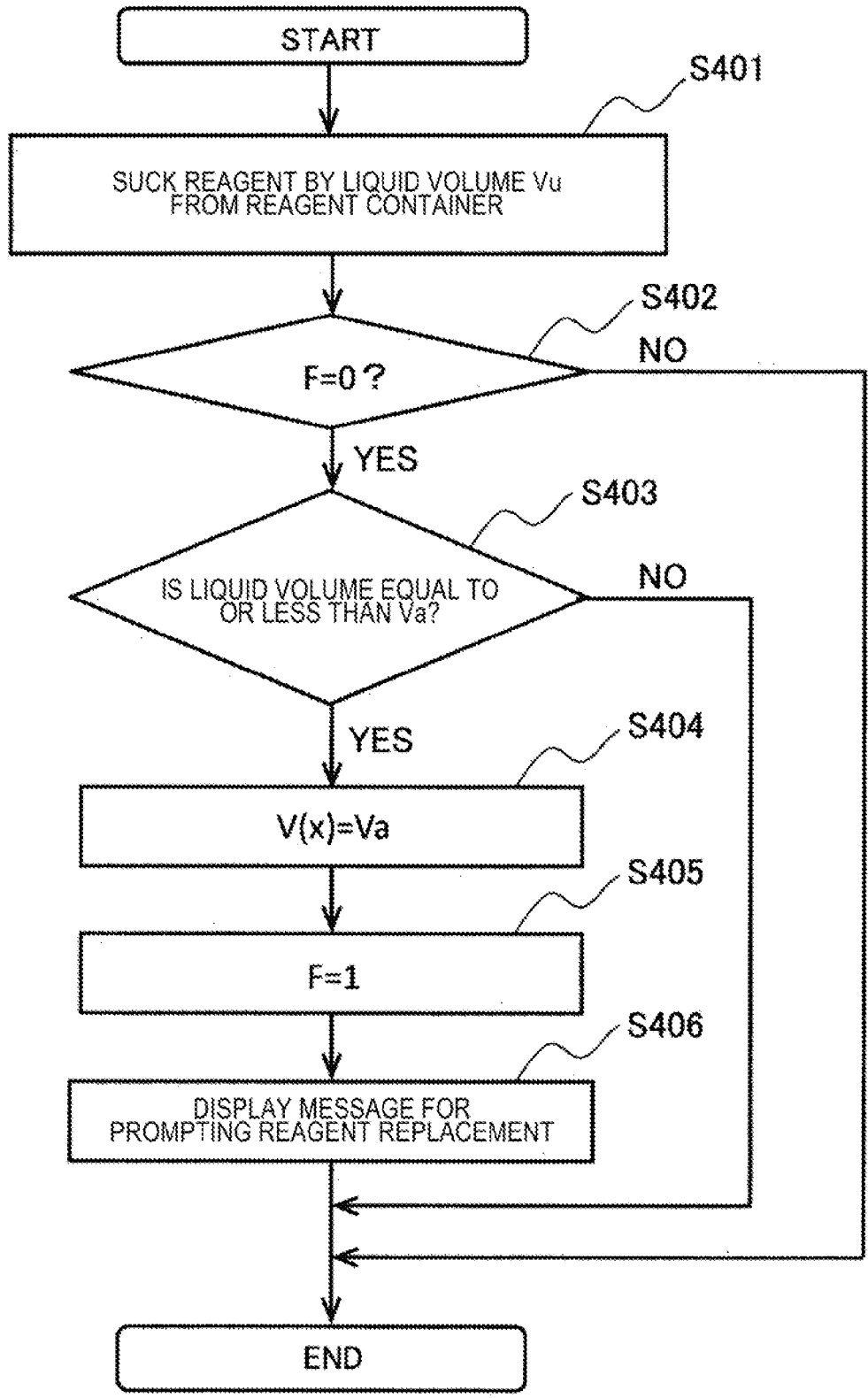

[FIG. 5]
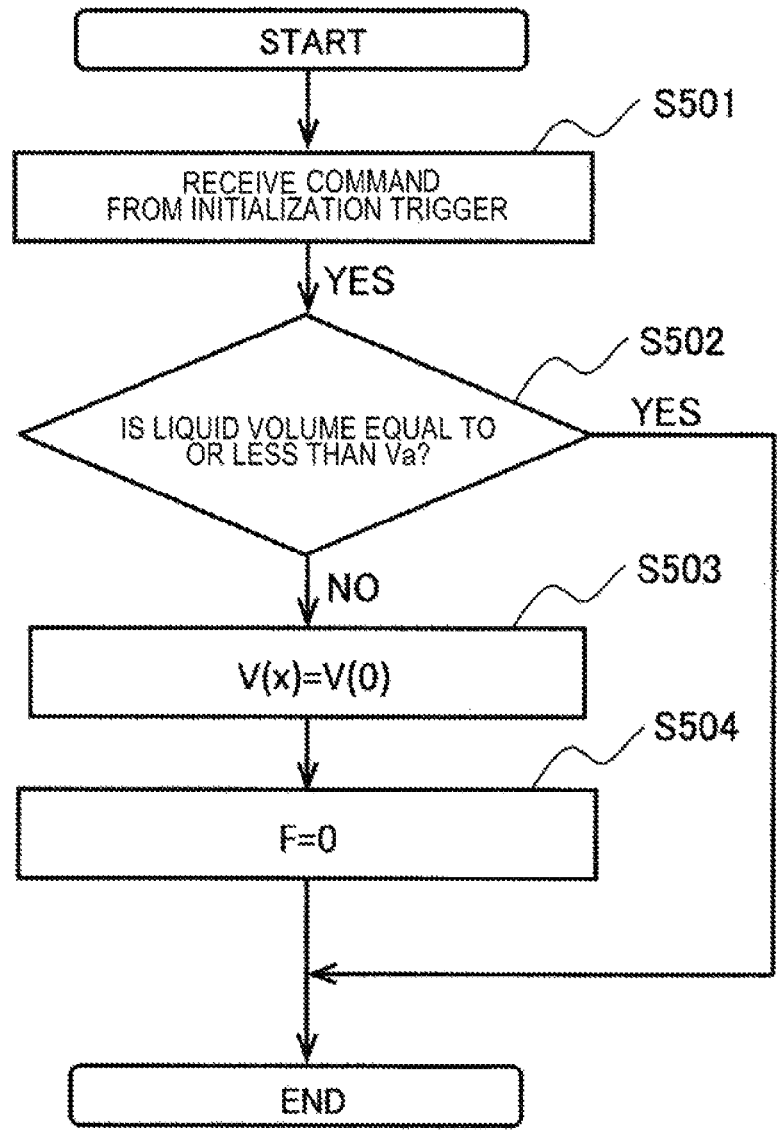

AUTOMATIC ANALYZER

TECHNICAL FIELD

The present invention relates to an automatic analyzer.

BACKGROUND ART

In an automatic analyzer, a reagent filled in a reagent container is sucked and mixed with a sample (a biological sample such as blood or urine) in a reaction vessel. When there is an abnormality in a suction amount of the reagent, an automatic analysis operation is stopped. Here, there is a method of detecting a liquid level (liquid volume) of the reagent in the reagent container using refraction or reflection of light (see PTL 1).

CITATION LIST

Patent Literature

PTL 1: JP-A-11-72369

SUMMARY OF INVENTION

Technical Problem

In PTL 1, deformation of the reagent container is not considered. A resin such as PE or PS may be used as the material of the reagent container, and a wall surface of the reagent container may be thinned for use of a pouch container and cost reduction, so that the wall surface of the reagent container may be distorted when the reagent is filled. When detecting the liquid volume using the reflection or refraction of light, a corresponding shape of the reagent container is limited.

Accordingly, an object of the invention is to provide an automatic analyzer which detects a liquid volume of a reagent irrespective of a shape of a reagent container.

Solution to Problem

An automatic analyzer according to an aspect of the invention includes: a reagent container that contains a reagent; an emission unit that is provided outside the reagent container and emits light so as to pass inside the reagent container; a light receiving unit that is provided outside the reagent container and receives the light emitted from the emission unit; and a determination unit that, based on the light received by the light receiving unit, detects a liquid level inside the reagent container, and determines whether a liquid volume in the reagent container becomes equal to or less than a predetermined value from the liquid level, wherein a wavelength of the light is determined based on a material of the reagent container and a type of the reagent.

Advantageous Effect

According to this invention, the automatic analyzer which detects the liquid volume of the reagent irrespective of the shape of the reagent container can be provided.

BRIEF DESCRIPTION OF DRAWINGS

FIG. 1 a diagram illustrating an example of a configuration of an automatic analyzer.

FIG. 2A is a view of a corner portion of a reagent container in which no reagent exists as viewed from a top.

FIG. 2B is a view of a corner portion of a reagent container in which a reagent exists as viewed from the top.

FIG. 3A is a diagram illustrating light absorption spectra of a reagent and a reagent container.

FIG. 3B is a diagram a correspondence relationship between wavelengths for the reagent and the reagent container.

FIG. 4 is a flowchart of a reagent suction cycle.

FIG. 5 is a flowchart of an initialization cycle of a reagent management amount.

DESCRIPTION OF EMBODIMENTS

Hereinafter, an embodiment will be described.

First Embodiment

FIG. 1 is a diagram illustrating an example of a configuration of an automatic analyzer. The automatic analyzer includes an incubator (reaction disk) 887 capable of mounting a plurality of reaction vessels 888 in which a mixture of a sample and a reagent is contained, a reagent container 101 that holds a reagent 107, a nozzle 104 configured to suck the reagent 107 from the reagent container 101, a reagent probe 886 configured to dispense the reagent sucked from the reagent container 101 to the reaction vessel 888, a sample probe 890 configured to dispense the sample sucked from a sample container 891 to the reaction vessel 888, a management unit 110 configured to manage a liquid volume of the reagent 107 in the reagent container 101, and a display unit 115 configured to display information to a user. The reagent probe 886 is connected to a syringe 885 (metering pump) via a dispensing flow path 770, and a valve 772 is provided in a middle of the dispensing flow path 770. The nozzle 104 is connected to the syringe 885 via a dispensing flow path 771, and a valve 773 is provided in a middle of the dispensing flow path 771.

The reagent probe 886 performs suction of the reagent from the reagent container 101 via the nozzle 104 by the syringe 885 and discharge of the reagent to the reaction vessel 888. The sample probe 890 is rotated vertically and horizontally by a moving mechanism (not shown) to move between the reaction vessel 888 and the sample container 891, and sucks and discharges the sample by a suction and discharge mechanism (not shown).

The syringe 885 has a pressure sensor, detects a pressure in the dispensing flow paths 770 and 771 when sucking and discharging the sample based on a pressure signal in the flow path, and determines whether the reagent 107 is normally sucked from the nozzle 104. For example, when the pressure sensor determines that the reagent 107 is not normally sucked, such as when the reagent 107 cannot be sucked from the nozzle 104 in a state where the liquid volume of the reagent 107 in the reagent container 101 is almost zero, the management unit 110 stops an apparatus operation so as not to output an abnormal analysis result.

FIG. 2 is a view of a corner portion of the reagent container as viewed from a top, in which FIG. 2A shows a case where no reagent exists, and FIG. 2B shows a case where a reagent exists.

An emission unit 102 configured to emit light 150 is provided outside the reagent container 101, and is disposed so that the light 150 transmits inside of the reagent container 101. A light receiving unit 103 configured to receive the light 150 is provided outside the reagent container 101, and is disposed on an optical path of the light 150. The emission unit 102 is formed of a light emitting element such as a light emitting diode, and the light receiving unit 103 is formed of a light receiving element such as a photodiode.

When the reagent 107 does not exist on the optical path, the light 150 transmits through a wall surface 105 and a wall surface 106 of the reagent container 101 and is received by the light receiving unit 103. On the other hand, when the reagent 107 exists on the optical path, the light 150 is absorbed by the reagent 107 and attenuated, and thus is not received by the light receiving unit 103.

The emission unit 102 is disposed such that an incident angle is $0<\theta<90°$ with respect to the wall surface 105 of the reagent container. The emission unit 102 is disposed such that the nozzle 104 does not exist on the optical path of the light 150 in order to prevent the light 150 from being blocked by the nozzle 104. The light receiving unit 103 is disposed such that an emission angle is $0<\theta<90°$ with respect to the wall surface 106 of the reagent container. The emission unit 102 and the light receiving unit 103 are provided at a height of a predetermined value corresponding to a liquid volume at which disturbance of an apparatus operation due to shortage of the reagent does not occur.

The emission unit 102 and the light receiving unit 103 are provided to face each other with the reagent container 101 being interposed therebetween at a height H at which the reagent 107 has a predetermined amount Va. For example, when the rectangular parallelepiped reagent container 101 has a bottom area S, the height H at which the liquid volume of the reagent 107 in the reagent container 101 becomes the predetermined amount Va is determined by $H=Va/S=(Vd+Vt)/S$. That is, the height H is a value obtained by adding a reagent liquid volume Vt required for an operation of analyzing the number of cells that can be stored in the incubator 887 to a minimum amount Vd at which the reagent cannot be sucked from the nozzle 104, and then dividing by the bottom area S. For a reagent container with an undefined outer shape such as a pouch, the liquid height cannot be specified by calculation based on the above container cross-sectional area. In that case, the predetermined value Va is defined based on a height of a suction port of the nozzle and the liquid height.

FIG. 3 is a diagram showing a relationship between the reagent and the reagent container, in which FIG. 3A is a diagram illustrating light absorption spectra of the reagent and the reagent container, and FIG. 3B is a diagram illustrating a correspondence relationship between wavelengths for the reagent and the reagent container.

A wavelength of the light 150 is selected based on a material of the reagent container 101 and a type of the reagent 107. For example, in a case of a combination of the reagent 107 being a substantially colorless reagent A containing moisture that is transparent and transmits visible light and the reagent container 101 being a translucent or opaque colored rectangular parallelepiped container C having a color such as white formed of a plastic resin such as polyethylene or polystyrene, near-infrared light having a wavelength of $\lambda 1$ (about 1450 nm) or $\lambda 3$ (about 1940 nm) which is absorbed by the moisture contained in the reagent A and is well transmitted through the plastic resin is used. In addition, in a case of a combination of the reagent 107 being a colored reagent B such as white and the reagent container 101 being a transparent (substantially colorless) cylindrical container D made of glass such as borosilicate glass or soda-lime glass, visible light having a wavelength of $\lambda 2$ (400 nm to 800 nm) which is dispersed or absorbed in the reagent B and is well transmitted through the container D is used.

Similarly, in a case of a combination of the reagent A and the container D (colorless reagent and colorless container), one of $\lambda 1$, $\lambda 2$, $\lambda 3$ is used, and in a case of a combination of the reagent B and the container C (colored reagent and colored container), $\lambda 1$ or $\lambda 3$ is used. In addition, the wavelength may be selected according to a variation of the combination.

In this way, by determining the wavelength of the light 150 based on the material of the reagent container and the type of the reagent, the liquid level of the reagent can be detected regardless of a shape of the container, for example, even for a reagent container having an undefined outer shape such as a pouch and an undefined angle between the wall surface and an optical axis. It is possible to eliminate restrictions on the arrangement such that the incident angle or the emission angle is $0<\theta<90°$.

Next, the management unit 110 will be described. The management unit 110 includes a calculation unit 111 configured to calculate a remaining liquid amount based on a used liquid amount, a determination unit 112 configured to determine, based on whether the light 150 is received by the light receiving unit 103, whether a liquid level of the reagent 107 is equal to or less than the height H, an initialization unit 113 configured to initialize the liquid volume, and a warning unit 114 configured to display on the display unit 115 a message notifying that the liquid volume of the reagent 107 in the reagent container 101 is low, and prompt an operator to replace the reagent container 101 when the determination unit 112 determines that the liquid level of the reagent 107 is equal to or less than the height H.

Here, the calculated liquid volume of the reagent 107 in the reagent container 101 managed by the management unit 110 is defined as a management liquid volume V(x) (x is the number of times of suction), the liquid volume sucked from the reagent container 101 is defined as a suction liquid volume Vu, and the liquid volume of the reagent 107 contained in a new reagent container 101 is defined as an initial liquid volume V(0).

The calculation unit 111 calculates a current management liquid volume V(x) using the suction liquid volume Vu sucked from the reagent container 101 by driving the syringe 885. The management liquid volume V(x) is a value $(V(x)=V(x-1)-Vu)$ obtained by subtracting the suction liquid volume Vu from a management liquid volume $V(x-1)$ before sucking the reagent.

The initialization unit 113 sets the management liquid volume V(x) to an initial value V(0). An initialization operation is performed according to a command from an initialization trigger 116 (such as a switch). When the reagent container 101 is replaced with a new one, by executing the initialization operation by the initialization trigger 116, the management unit 110 recognizes that the current reagent container 101 contains an initial amount V(0).

When the determination unit 112 determines that the liquid level of the reagent 107 is equal to or less than H (the liquid volume is the predetermined amount Va), the management unit 110 corrects the management liquid volume V(x) to a value of the predetermined amount Va, and sets a correction flag F to 1. The correction flag is a flag for determining whether the correction is executed, and is 0 when a correction operation is not executed, and is 1 when the correction operation is executed. Here, when F=1 (the liquid volume correction operation has already been executed), even if the determination unit 112 determines that the liquid volume of the reagent 107 is equal to or less than the predetermined amount Va, the liquid volume correction operation is not executed.

FIG. 4 is a flowchart of a reagent suction operation performed by the management unit 110.

First, the management unit 110 controls the nozzle 104 to suck the reagent 107 from the reagent container 101 (S401). At this time, the calculation unit 111 sets a value obtained by subtracting the suction liquid volume Vu from the management liquid volume V(x−1) before suction as the current management liquid volume V(x).

Next, the management unit 110 determines whether F=0 (S402). When F=1, the management unit 110 ends a reagent suction cycle without performing the liquid volume correction operation. When F=0, the determination unit 112 determines whether the liquid volume of the reagent 107 is equal to or less than Va (whether the light receiving unit 103 detects light) (S403). When the determination unit 112 determines that the liquid volume of the reagent 107 is greater than Va, the management unit 110 ends the reagent suction cycle, and when the determination unit 112 determines that the liquid volume of the reagent 107 is equal to or less than Va, the management unit 110 sets the management liquid volume V(x) to the predetermined value Va (S404). The management unit 110 sets F to 1 (S405), and controls the warning unit 114 to display a message for prompting reagent replacement on the display unit 115 (S406).

When the correction according to this flow is not performed, for example, when an actual liquid volume is larger than the management liquid volume, if the management liquid volume becomes 0, the reagent container 101 is replaced even though the actual liquid volume remains, and waste increases. In addition, when the actual liquid volume is smaller than the management liquid volume, the management liquid volume exists even if the actual liquid volume becomes 0, and therefore, suction (empty suction) is performed in a state where no reagent exists. However, according to this flow, such a problem can be avoided because when the actual liquid volume and the management liquid volume are different, the management liquid volume and the actual liquid volume are corrected to substantially the same value with the fact that the liquid level of the reagent 107 becomes equal to or less than H as a trigger.

FIG. 5 is a flowchart of an initialization operation of the management liquid volume V(x) by the management unit 110.

Upon receiving a command from the initialization trigger 116 (S501), the initialization unit 113 determines whether the liquid volume of the reagent 107 is equal to or less than Va (S502). When it is determined that the liquid volume of the reagent 107 is equal to or less than Va, the initialization unit 113 does not execute the initialization operation. When it is determined that the liquid volume of the reagent 107 is greater than Va, the initialization unit 113 sets the management liquid volume V(x) to the initial value V(0) (S503), and sets F to 0 (S504).

This flow is significant in that the management unit 110 can perform the liquid volume correction. When the reagent is above the light 150, the liquid volume correction can be performed by the flow of FIG. 4. On the other hand, when the liquid volume correction is not performed despite the reagent being below the light 150, since there is no chance to perform the liquid volume correction, the empty suction of the reagent may be generated. Accordingly, an initialization of the management liquid volume can avoid the empty suction of the reagent. The initialization trigger 116 is activated by a user pressing a switch. However, a sensor that monitors an installation of the reagent container 101 may be provided, and the initialization trigger 116 may be activated based on a signal from the sensor.

According to the above embodiment, it is possible to accurately detect the reagent liquid volume regardless of the shape of the reagent container. A consistency of the initial liquid volume generated due to various factors (in a case where the user spills a new reagent container, initializes the management liquid volume for the reagent container in use, or the like) can be corrected. By correcting a reagent amount, it is possible to avoid an abnormality in the suction amount of the reagent and to prevent wasteful consumption of the sample. Further, a remaining amount of the reagent after use can be minimized, and a running cost of the apparatus can be reduced.

REFERENCE SIGN LIST

101: reagent container
102: emission unit
103: light receiving unit
104: nozzle
105: wall surface of reagent container on side of emission unit
106: wall surface of reagent container on side of light receiving unit
107: reagent inside reagent container
110: management unit
111: calculation unit
112: determination unit
113: initialization unit
114: warning unit
115: display unit
116: initialization trigger
770: flow path (on side of reagent probe)
771: flow path (on side of nozzle)
772: valve (on side of reagent probe)
773: valve (on side of nozzle)
885: syringe
886: reagent probe
887: incubator
888: reaction vessel
890: sample probe
891: sample container

The invention claimed is:

1. An automatic analyzer comprising:
a reagent container that contains a reagent;
a nozzle that sucks the reagent from the reagent container;
a syringe coupled to the nozzle;
a reagent probe, coupled to the nozzle via the syringe, that dispenses the reagent sucked from the reagent container to a reaction vessel;
an emission unit provided outside the reagent container and emits light so as to pass through an inside of the reagent container, the light having a wavelength that is based on a material of the reagent container and a type of the reagent, the type of the reagent being colored or substantially colorless containing a moisture that is transparent and transmits visible light;
a light receiving unit that is provided outside the reagent container and receives the light emitted from the emission unit; and
a management unit configured to:
calculate a remaining liquid amount of the reagent in the reagent container as a management liquid volume based on a suction liquid volume sucked from the reagent container and an initial liquid volume, based on the light received by the light receiving unit, detect a liquid level of the reagent inside the reagent container, and determine whether a liquid volume of the reagent in the reagent container is equal to or less than a predetermined value from the liquid level, and correct the management liquid volume to the predetermined value upon determining the liquid volume inside the reagent container is equal to or less than the predetermined value.

2. The automatic analyzer according to claim 1, wherein the emission unit and the light receiving unit are disposed such that the nozzle is not in an optical path of the light emitted from the emission unit in a state in which at least a portion of the nozzle is immersed in the reagent, wherein the reagent container is rectangular parallelepiped and the light emitted from the emission unit is obliquely incident on an outer surface of the reagent container.

3. The automatic analyzer according to claim 1, wherein the emission unit and the light receiving unit are provided at a predetermined height, wherein the predetermined height is based on a minimum liquid volume of the reagent in the reagent container that is required to operate the automatic analyzer.

4. The automatic analyzer according to claim 1, further comprising:

a display unit coupled to the management unit, wherein the management unit is configured to display a message, on the display unit, for prompting replacement of the reagent container upon determining the liquid volume of the reagent inside the reagent container is equal to or less than the predetermined value.

5. The automatic analyzer according to claim 1, wherein the management unit is configured to:

perform an initialization operation of setting initializing the management liquid volume by setting it to an initial value, and not perform the initialization operation upon determining the liquid volume of the reagent inside the reagent container is equal to or less than the predetermined value.

6. The automatic analyzer according to claim 1, wherein the wavelength of the light is 1450 nm or 1940 nm.

7. The automatic analyzer according to claim 3, wherein a tip end of the nozzle is disposed below the predetermined height.

8. The automatic analyzer according to claim 7, wherein the emission unit is a single emission unit, which is disposed at the predetermined height, and wherein the light receiving unit is a single light receiving unit, which is disposed at the predetermined height.

9. The automatic analyzer according to claim 8, wherein the single emission unit is a light emitting diode, which is disposed at the predetermined height, and wherein the single light receiving unit is a photodiode, which is disposed at the predetermined height.

10. The automatic analyzer according to claim 1, further comprising:

a first flow path connecting the nozzle to the syringe; and a second flow path connecting the reagent probe to the syringe.

* * * * *